UNITED STATES PATENT OFFICE.

ADOLPH SOMMER, OF BERKELEY, CALIFORNIA.

PROCESS OF DISSOLVING LACTIC ACID IN OILS AND FATS.

SPECIFICATION forming part of Letters Patent No. 470,715, dated March 15, 1892.

Application filed April 13, 1891. Serial No. 388,709. (No specimens.)

*To all whom it may concern:*

Be it known that I, ADOLPH SOMMER, a citizen of the United States, and a resident of Berkeley, in the county of Alameda and State of California, have invented a new and useful Process of Dissolving Lactic Acid in Oils and Fats; and I do hereby declare that the following is a full and exact description of the invention, which will enable others skilled in chemical manipulations to apply the same.

Ordinary lactic acid as generally met with in commerce always contains more or less water, and the insolubility of the commercial acid in most of the oils and fats is, I have found, due to the presence of this water. Most of the water can be removed by evaporating the same on a water or oil bath till the acid has acquired a sirupy consistence; but it is not practicable to push the evaporation any further, since there is great danger that a portion, if not all, of the acid be converted into lactic anhydride, which, owing to its bitter taste, would make the acid unfit for the purpose of improving the taste of oils and fats. Now I have found that the objectionable water can be removed from the acid without converting the latter into lactic anhydride, and that a sufficient quantity of the acid can be made to dissolve in an oil or fat by mixing the concentrated lactic acid with the oil or fat to be acidulated, adding thereto a suitable dehydrating agent, and digesting the mixture, with occasional agitation, for some time, either at the ordinary or at an elevated temperature. For most purposes it is advantageous to carry on the digestion in the warm state because a gentle heat greatly facilitates the solution of the acid in the oil or fat. Only in the case of oils which suffer by heat is the operation carried on in the cold.

Of the numerous substances which may be employed as dehydrating agents I prefer to use dry powdered chloride of sodium in the case of a warm digestion and powdered anhydrous sulphate of sodium in the case of a cold digestion. Of these substances I generally take about the same weight as has been used of concentrated lactic acid. When during the digestion the oil or fat becomes clear and remains clear after cooling, the acidulated oil or fat is decanted, filtered, if necessary, and preserved in air-tight vessels.

The acidulous product obtained in this or in any other manner forms the subject of a concurrent application bearing the Serial No. 224,052, filed January 11, 1887, and entitled "Solution of lactic acid in oils and fats."

Having thus described my invention, what I claim as new, and desire to secure by Letters Patent, is—

The process of dissolving lactic acid in oils and fats, consisting in digesting concentrated lactic acid with the oil or fat in the presence of a dehydrating agent, substantially as described.

ADOLPH SOMMER.

Witnesses:
    THOS. F. GRABER,
    J. R. LITTLE.